United States Patent [19]
Horie et al.
[11] Patent Number: 4,543,208
[45] Date of Patent: Sep. 24, 1985

[54] MAGNETIC CORE AND METHOD OF PRODUCING THE SAME

[75] Inventors: Hiromichi Horie, Yokosuka; Mikio Morita, Yokohama; Itsuo Arima, Kawasaki, all of Japan

[73] Assignee: Tokyo Shibaura Denki Kabushiki Kaisha, Kawasaki, Japan

[21] Appl. No.: 564,847

[22] Filed: Dec. 23, 1983

[30] Foreign Application Priority Data

Dec. 27, 1982 [JP] Japan ........ 57-226736
Jul. 8, 1983 [JP] Japan ........ 58-124408

[51] Int. Cl.[4] ........ H01F 1/26; H01F 27/24; C04B 35/04

[52] U.S. Cl. ........ 252/62.54; 148/31.55; 148/31.57; 148/104; 148/105; 252/62.51; 252/62.53; 336/229; 336/233

[58] Field of Search ........ 252/62.54; 336/233

[56] References Cited

U.S. PATENT DOCUMENTS

| | | | |
|---|---|---|---|
| 2,330,590 | 9/1943 | Kaschke | 336/233 |
| 3,602,986 | 9/1971 | Conwicke . | |
| 3,929,658 | 12/1975 | Beske | 252/62.54 |
| 4,230,787 | 10/1980 | Watanabe et al. | 252/62.54 |
| 4,238,341 | 12/1980 | Kato et al. | 252/62.54 |
| 4,264,698 | 4/1981 | Takayama et al. | 252/62.54 |
| 4,285,825 | 8/1981 | Isobe et al. | 252/62.54 |
| 4,320,080 | 3/1982 | Esper et al. | 252/62.54 |
| 4,333,988 | 6/1982 | Yamada | 252/62.54 |
| 4,379,803 | 4/1983 | Tamai et al. | 252/62.54 |
| 4,397,751 | 8/1983 | Dickstein et al. | 252/62.54 |
| 4,420,408 | 12/1983 | Kajimoto | 252/62.54 |
| 4,448,842 | 5/1984 | Yamaguchi | 252/62.54 |

FOREIGN PATENT DOCUMENTS

| | | |
|---|---|---|
| 2628207 | 1/1978 | Fed. Rep. of Germany . |
| 0052217 | 6/1930 | Japan . |
| 0102131 | 5/1935 | Japan . |
| 47-22514 | 6/1972 | Japan . |
| 403368 | 1/1934 | United Kingdom . |

OTHER PUBLICATIONS

R. Boll, "Weichmagnetische Werkstoffe", 3rd Edition, 1977 Vacuumschemelze GmbH, Hanau, pp. 43–49.
European Patent Application No. 83101871.8-Publication No. 0 087 781, Fld. Feb. 25, 1983.
European Search Report.

*Primary Examiner*—Arthur P. Demers
*Attorney, Agent, or Firm*—Schwartz, Jeffery, Schwaab, Mack, Blumenthal & Evans

[57] ABSTRACT

Disclosed is an magnetic core comprising a molded product made of an iron powder and/or an iron alloy magnetic powder having a mean particle size of 10 to 100 μm, and 1.5 to 40%, as a total amount in terms of volume ratio, of an insulating binder resin and an insulating inorganic compound powder. Also disclosed is a useful method of producing the magnetic core.

11 Claims, 3 Drawing Figures

MAGNETIC CORE AND METHOD OF PRODUCING THE SAME

BACKGROUND OF THE INVENTION

This invention relates to a magnetic core, and more particularly, to a magnetic core which is excellent in the frequency characteristic of magnetic permeability and also has a high magnetic flux density. It also relates to a method of producing the magnetic core.

In the prior art, in electrical instruments such as an electric power converting device, including a device for converting an alternating current to a direct current, a device for converting an alternating current having a certain frequency to another alternating current having a different frequency and a device for converting a direct current to an alternating current such as so called inverter, or a non-contact breaker, etc., there have been employed, as electrical circuit constituent elements thereof, semiconductor switching elements, typically thyristors and transistors, and reactors for relaxation of turn-on stress in a semiconductor switching element, reactors for forced commutation, reactors for energy accumulation or transformers for matching connected to these elements.

As an example of such electric power converting devices, FIG. 1 shows an electrical circuit of a device for converting a direct current to an alternating current. The electric power converting device shown in FIG. 1 includes a thyristor 1, a reactor for relaxation of turn-on stress of semiconductor switching element 2 and a transformer for matching 3. Numeral 4 designates load on alternating current and numeral 5 a direct current power source.

Through these reactors or transformers, a current containing a high frequency component reaching 100 KHz or higher, even to over 500 KHz in some cases, may sometimes pass on switching of the semiconductors.

As the magnetic core constituting such a reactor or a transformer, there have been employed in the prior art such materials as shown below. That is, there may be mentioned:

(a) a laminated magnetic core produced by laminating thin electromagnetic steel plates or permalloy plates having applied interlayer insulations;

(b) a so-called dust core produced by caking carbonyl iron minute powder or permalloy minute powder with the use of, for example, a resin such as a phenolic resin; or (c) a so-called ferrite core produced by sintering an oxide type magnetic material.

Among these, a laminated magnetic core, while it exhibits excellent electric characteristics at a commercial frequency band, is marked in its iron loss at higher frequency band, particularly increased eddy-current loss, in proportion to the square of a frequency. Another property is that the magnetizing power can resist change at inner portions farther from the surface of plate materials constituting the magnetic core because of the eddy-current of the magnetic core material. Accordingly, a laminated magnetic core can be used only at a magnetic flux density which is far lower than the saturated magnetic flux density inherently possessed by the magnetic core material itself, and there is also involved the problem of very great eddy-current loss. Further, a laminated magnetic core has a problem of extremely lower effective magnetic permeability relative to higher frequency, as compared with that relative to commercial frequency. When a laminated magnetic core having these problems is used in a reactor, a transformer, etc. connected to a semiconductor switching element through which a current having a high frequency component passes, the magnetic core itself must be of large dimensions to compensate for effective magnetic permeability and magnetic flux density, whereby, also because of lower effective magnetic permeability, there is also involved the problem of increased copper loss.

On the other hand, there is employed as a magnetic core material, a compressed powdery magnetic body called a dust core, as described in detail in, for example, Japanese Pat. No. 112235. However, such dust cores generally have considerably lower values of magnetic flux and magnetic permeability. Among them, even a dust core using carbonyl iron powder having a relatively higher magnetic flux density has a magnetic flux density of only about 0.1 T and a magnetic permeability of only about $1.25\times10^{-5}$ H/m at a magnetizing force of 10000 A/m. Accordingly, in a reactor or a transformer using a dust core as the magnetic core material, the magnetic core must inevitably be of large dimensions, whereby there is involved the problem of increased copper loss in a reactor or a transformer.

Alternatively, a ferrite core employed in a small scale electrical instrument has a high resistivity value and a relatively excellent high frequency characteristic. However, a ferrite core has a magnetic flux density as low as about 0.4 T at a magnetizing force of 10000 A/m, and the values of magnetic permeability and the magnetic flux density at the same magnetizing force are respectively varied by some ten percent at $-40°$ to 120° C., which is the temperature range useful for the magnetic core. For this reason, when a ferrite core is to be used as an magnetic core material for a reactor or a transformer connected to a semiconductor switching element, the magnetic core must be enlarged because of the small magnetic flux density. But, a ferrite core, which is a sintered product, can be produced with a great size only with difficulty and thus is not suitable as the magnetic core. Also, a ferrite core involves the problems of great copper loss caused by its low magnetic flux density, of its great characteristic change when applied for a reactor or a transformer due to the great influence by temperatures on magnetic permeability and magnetic flux density, and further of increased noise generated from the magnetic core due to the greater magnetic distortion, as compared with an silicon steal, etc.

An object of this invention is to provide a magnetic core to be used for a reactor or a transformer connected to a semiconductor element, which has overcome the problems described above, and also has both an excellent frequency characteristic of magnetic permeability and a high magnetic flux density.

SUMMARY OF THE INVENTION

The magnetic core of this invention is a molded product comprising a magnetic powder, a binder resin and an inorganic compound powder. More specifically, the magnetic core of the present invention comprises a molded product of either one or both of an iron powder and an iron alloy magnetic powder having a mean particle size of 10 to 100 μm, and 1.5 to 40%, as a total amount in terms of volume ratio, of insulating binder resin and insulating inorganic compound powder.

This invention will be described below in detail with reference to the accompanying drawings.

DESCRIPTION OF THE PREFERRED EMBODIMENTS

Figure 1:
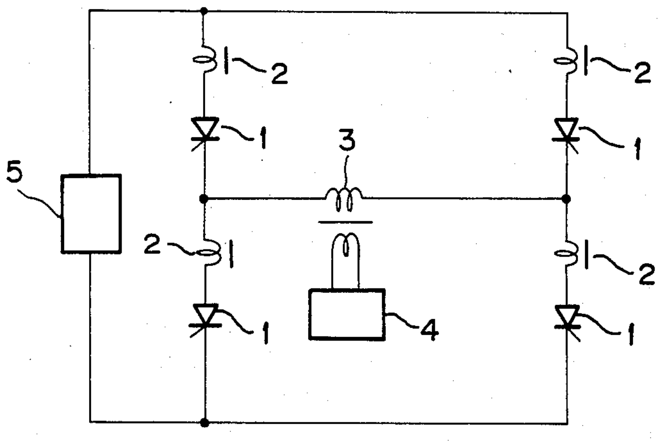
FIG. 1 shows an example of an electric circuit in a device for converting direct current to alternate current.

The magnetic powder of iron and/or an iron alloy to be used in this invention is required to have a mean particle size of 100μ or less. This is because the aforesaid magnetic powder has a resistivity of 10 μΩ·cm to some ten μΩ·cm at the highest, and therefore in order to obtain sufficient magnetic core material characteristics even in an alternating current containing high frequencies yielding skin effect, the magnetic powder must be made into minute particles, thereby to have the particles from their surfaces to inner portions contribute sufficiently to magnetization. However, if the mean particle size is extremely small, namely less than 10 μm, when molded at the molding stage as hereinafter described under a molding pressure of 10000 MPa or lower, the density of the resultant magnetic core will not be sufficiently large, resulting in an inconvenient of lowering of magnetic flux density. Consequently, in the present invention, the mean particle size of iron powder or iron alloy magnetic powder is set within the range from 10 μm to 100 μm.

Referring now to the relation between the mean particle size (D μm) of these powders and resistivity thereof (ρμΩ·cm), it is preferred to satisfy the relation of $\rho/D^2 \geqq 4\times10^{-3}$ as represented by only the values of D and ρ.

The iron powder or iron alloy magnetic powder is not particularly limited, but any desired powder may be available, so long as it can satisfy the various parameters as mentioned above, including, for example, powder of pure iron, Fe-Si alloy powder, typically Fe-3%Si alloy powder, Fe-Al alloy powder, Fe-Si-Al alloy powder, Fe-Ni alloy powder, Fe-Co alloy powder and the like, and each one or a suitable combination of these can be employed.

The insulating binder resin to be used in this invention has the function of a binder to bind the particles of the aforesaid iron powder or iron alloy magnetic powder, simultaneously with insulation of the particles of the iron powder or iron alloy magnetic powder from each other by coating of the surfaces thereof, thereby imparting sufficient effective resistivity value for alternating current magnetization to the magnetic core as a whole. As such binder resins, there may be included various thermosetting and thermoplastic resins such as epoxy resins, polyamide resins, polyimide resins, polyester resins, polycarbonate resins, polyacetal resins, polysulfone resins, polyphenylene oxide resins and the like, and each one or a suitable combination of these resins may be used.

On the other hand, the powder of an insulating inorganic compound also fulfills the function of enhancing the effective resistivity value for alternating current magnetization to the magnetic core as a whole by existing among the particles of the iron conductive powder or iron alloy magnetic powder, simultaneously with enhancement of molding density of the magnetic core through reduction of frictional resistance between the particles of the iron powder or iron alloy magnetic powder during molding of the magnetic core. As such inorganic compounds, there may be included calcium carbonate, silica, magnesia, alumina, hematite, mica, various glasses or a suitable combination thereof. Of course, these inorganic compounds are required to be not reactive with the above-mentioned iron powder or iron alloy magnetic powder and the binder resin.

As to the mean particle size of the inorganic compound powder, it is preferably 1/5 or less of the mean particle size of the iron powder or iron alloy magnetic powder, (namely, it is 20 μm or less) in view of its dispersibility as well as the relation to the characteristics of the magnetic core material.

In the magnetic core of this invention, the total amount of the binder resin and the inorganic compound powder, relative to the whole volume, should be set at the range of from 1.5 to 40%. When the volume ratio is less than 1.5%, the molding density of the magnetic core cannot be enhanced and the effective resistivity value is also lowered. On the other hand, in excess of 40%, the increasing tendency of the effective resistivity value will reach the saturated state, and further the molding density is lowered to result also in lowering of the saturated magnetic flux density, whereby the magnetic flux density under a magnetization force of 10000 A/m will become similar to that of ferrite.

To mention the volume ratio mutually between the binder resin and the inorganic compound powder, the ratio of the former to the latter may be 98 to 20 vol. %:2 to 80 vol. %, preferably 95 to 30 vol. %:5 to 70 vol. %.

The magnetic core of this invention may be produced, for example, as follows. That is, predetermined amounts of the three components of (i) iron powder, iron alloy magnetic powder or a mixture thereof, (ii) binder resin and (iii) inorganic compound powder are sufficiently mixed by a mixer and the resultant mixture is then compression molded in a mold. The molding pressure applied may be generally 1000 MPa or lower. If necessary, a heat treatment at a temperature of about 30° to 300° C. may also be applied on the molded product for curing of the binder resin.

Alternatively, as a preferred embodiment of the method, the above steps for mixing the iron powder and/or the iron alloy magnetic powder may be carried out by first mixing the insulating inorganic compound powder with the resin to prepare a powdery product which is used as a powdery binder, and then mixing the powdery binder with the iron powder and/or the iron alloy magnetic powder. Therafter the compression molding and the optional heat treatment may be carried out to produce the magnetic core.

Accordingly, in the above preferred embodiment, the method of producing a magnetic core according to this invention comprises a step of preparing a binder by mixing an insulating inorganic compound powder with a resin, a step of grinding said binder into a powder to prepare a powdery binder, and a step of mixing and compression molding said powdery binder with iron powder, iron alloy magnetic powder or a mixture thereof.

According to this method, the powdery binder is held homogeneously among the particles of the magnetic powder when the powdery binder is mixed with the magnetic powder of iron or iron alloy magnetic material. When the mixture is further compression molded, the inorganic compound power, having been homogeneously compounded in the powdery binder, plays the role of a carrier for introducing the resin into the spaces formed among the particles, whereby the resin is very homogeneously dispersed among the particles of the magnetic powder. As a result, a thin insulating layer can be surely formed among the particles and therefore it becomes possible to produce a magnetic core having large resistivity, namely, having large magnetic flux density and excellent frequency characteristic of magnetic permeability.

Moreover, the inorganic compound powder and the resin which have been effectively held among the particles of the magnetic powder may decrease the frictional resistance between the particles, whereby it becomes possible to enhance the space factor of the particles of the magnetic powder even under molding pressure of not more than 1000 MPa, peferably 100 to 1000 MPa, which is readily utilizable in an industrial field. A magnetic core having higher magnetic flux density can therefore be produced.

This invention will be described in greater detail by the following Examples.

EXAMPLES 1-7

Various kinds of magnetic powder and inorganic powder, having different mean particle sizes, and binder resins were formulated at the ratios (vol. %) indicated in Table 1, and these were sufficiently mixed. Each of the resultant mixtures was filled in a mold for molding of a magnetic core, in which compression molding was carried out under various prescribed pressures to a desired shape. The molded product was subjected to heat treatment for curing of the binder resin to provide a magnetic core.

For these magnetic cores, density, magnetic flux density under magnetization force of 10000 A/m were measured, and further effective resistivity were calculated from the eddy-current loss of the magnetic core relative to alternate current magnetization.

For comparison, also produced were cores using the materials having compositional proportions outside this invention (Comparative examples 1 and 2), those containing no inorganic compound powder (Comparative example 3) and those using magnetic powder of mean paticle sizes outside this invention (Comparative examples 4 and 5).

Results are summarized in Table 1.

TABLE 1

| | Components formulated | | | | | | | |
|---|---|---|---|---|---|---|---|---|
| | Magnetic powder | | | Inorganic compound powder | | | Binder resin | |
| | Kind | Mean particle size (μm) | Formulated ratio (vol. %) | Kind | Mean particle size (μm) | Formulated ratio (vol. %) | Kind | Formulated ratio (vol. %) |
| Example No. | | | | | | | | |
| 1 | Fe—0.5 Si | 37-50 | 98.4 | $CaCO_3$ | 2.7 | 0.08 | Epoxy | 1.52 |
| 2 | " | " | 90.0 | " | " | 2.0 | " | 8.0 |
| 3 | " | " | 80.0 | " | " | 12.0 | " | 8.0 |
| 4 | " | " | 65.0 | " | " | 20.0 | " | 15.0 |
| 5 | Fe—4.5 Si | 53-63 | 75.0 | Alumina | 5.7 | 5.0 | Epoxy | 20.0 |
| 6 | Fe | 44.7 | 98.4 | Silica | 0.17 | 0.1 | Polyamide | 1.5 |
| 7 | " | 100 | " | " | " | " | " | " |
| Comparative example | | | | | | | | |
| 1 | Fe—0.5 Si | 37-50 | 99.0 | $CaCO_3$ | 2.7 | 0.48 | Epoxy | 0.92 |
| 2 | " | " | 55.0 | " | " | 5.0 | " | 40.0 |
| 3 | Fe—4.5 Si | 53-63 | 75.0 | — | — | — | Epoxy | 25.0 |
| 4 | Fe | 150 | 98.4 | Silica | 0.17 | 0.1 | Polyamide | 1.5 |
| 5 | " | 250 | " | " | " | " | " | " |

| | Molding pressure (MPa) | Heating condition (°C. hr) | Characteristics of magnetic core: Density (g/cm³) | Magnetic flux density (T:Hm = 10000A/m) | Effective resistivity (mΩ · cm) |
|---|---|---|---|---|---|
| Example No. | | | | | |
| 1 | 600 | 200, 1 | 7.4 | 1.44 | 80 |
| 2 | " | " | 7.0 | 1.22 | 280 |
| 3 | " | " | 6.5 | 1.12 | 430 |
| 4 | " | " | 5.4 | 0.66 | 540 |
| 5 | 800 | 200, 1 | 6.1 | 0.78 | 550 |
| 6 | 500 | 150, 1 | 7.4 | 1.44 | 70 |
| 7 | " | " | 7.4 | 1.46 | 22 |
| Comparative example | | | | | |
| 1 | 600 | 200, 1 | 7.4 | 1.42 | 15 |
| 2 | " | " | 4.7 | 0.37 | 600 |
| 3 | 800 | 200, 1 | 5.7 | 0.66 | 540 |
| 4 | 500 | 160, 1 | 7.4 | 1.44 | 6 |
| 5 | " | " | 7.4 | 1.46 | 5 |

When the magnetic cores of Examples 1 to 4 were subjected to measurements of changes in magnetic permeability and magnetic flux density at temperatures of from −40° to 120° C., the percent changes obtained were all less than 10%.

Figure 2:
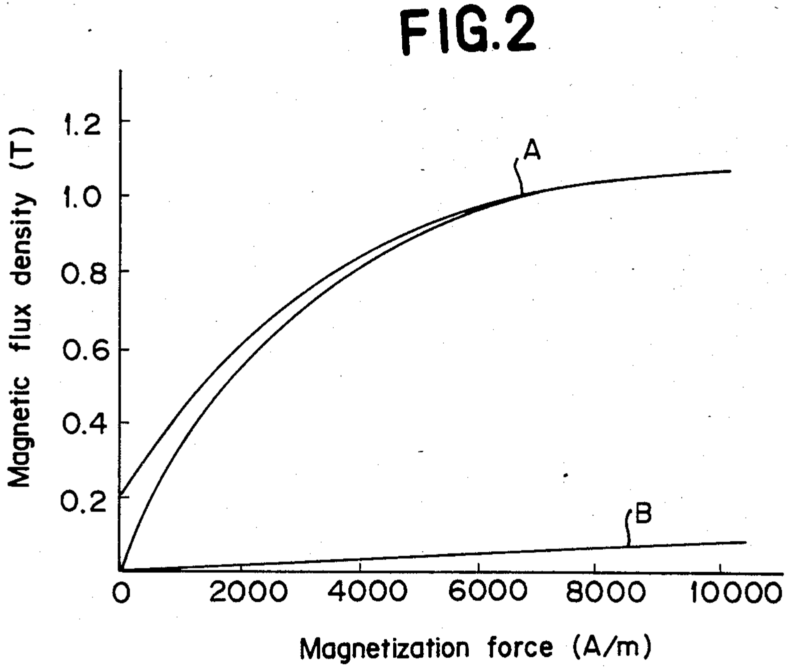
FIG. 2 shows direct current magnetization curves in the magnetic core of this invention (Example 3) and a dust core of the prior art.

FIG. 2 shows direct current magnetization curves representing changes in magnetic flux density for respective magnetizing forces, which were determined for the direct magnetization characteristic of the magnetic core of Example 3 and the magnetic core comprising the dust core of the prior art. It was confirmed that the magnetic core of this invention (curve A) was excellent, having higher magnetic flux density, as compared with the magnetic core of the prior art (curve B).

EXAMPLES 8–11

Mixtures prepared by mixing 84 vol. % of iron powders or iron alloy magnetic powders having different resistivities ($\rho$) and mean particle sizes (D), 1 vol. % of an alumina powder having a mean particle size of 1 $\mu$m or less and 15 vol. % of an epoxy resin were each molded under a pressure of 600 MPa, and heat treatment was applied on each product at 200° C. for 1 hour to provide a magnetic core.

For these magnetic cores, effective magnetic permeabilities at 1 kHz to 500 kHz were measured, and the ratios were determined relative to the effective magnetic permeability at 1 kHz as the standard. The results are shown in Table 2 as the relation with $\rho/D^2$.

TABLE 2

| | Iron or iron-based alloy powder* | | | Changes of effective magnetic permeability (1 kHz = 1) | | | |
|---|---|---|---|---|---|---|---|
| | Resistivity ($\rho\mu\Omega \cdot$ cm) | Mean particle size D $\mu$m | $\rho/D^2$ | 1 kHz | 100 kHz | 300 kHz | 500 kHz |
| Example | | | | | | | |
| 8 | 45 | 97 | $4.78 \times 10^{-3}$ | 1 | 1.00 | 0.98 | 0.95 |
| 9 | 80 | 50 | $3.2 \times 10^{-2}$ | 1 | 1.00 | 0.99 | 0.98 |
| 10 | 27 | 69 | $5.67 \times 10^{-3}$ | 1 | 1.00 | 0.98 | 0.95 |
| 11 | 10 | 44 | $5.17 \times 10^{-3}$ | 1 | 1.00 | 0.98 | 0.95 |
| Comparative example | | | | | | | |
| 6 | 45 | 115 | $3.4 \times 10^{-3}$ | 1 | 0.98 | 0.90 | 0.86 |
| 7 | 10 | 53 | $3.56 \times 10^{-3}$ | 1 | 0.98 | 0.89 | 0.77 |
| 8 | 10 | 97 | $1.06 \times 10^{-3}$ | 1 | 0.97 | 0.78 | 0.64 |
| 9 | 27 | 105 | $2.44 \times 10^{-3}$ | 1 | 0.98 | 0.89 | 0.84 |
| 10 | laminated magnetic core of 25$\mu$ permaloy sheet | | | 1 | 0.8 | 0.62 | 0.36 |

*Composition:

| | | | |
|---|---|---|---|
| Example 8: | Fe—3% Si | Comparative example 6: | Fe—3% Si |
| Example 9: | Fe—6.5% Si | Comparative example 7: | Pure iron |
| Example 10: | Fe—1.5% Si | Comparative example 8: | " |
| Example 11: | Pure iron | Comparative example 9: | Fe—1.5% Si |

EXAMPLE 12

A mixture prepared by mixing 40 vol. % of Fe-3Al powder having a mean particle size of 63 $\mu$m, 10 vol. % of Fe-Ni powder having a mean particle size of 53 $\mu$m or less, Fe powder having a mean particle size of 44 $\mu$m, 0.8 vol. % of glass powder having a mean particle size of 8 $\mu$m and 14.2 vol. % of a polyamide resin was compression molded under a pressure of 800 MPa, followed by heat treatment at 100° C. for 1 hour, to provide an magnetic core. This magnetic core was found to have an effective resistivity of 350 m$\Omega$·cm.

In the above Examples, when an polyimide resin or a polycarbonate resin was employed in place of the epoxy resin, or when other inorganic compounds such as magnesia were employed, the same results could also be obtained.

EXAMPLE 13

Inorganic compound of $SiO_2$ (silica) powder having mean particle size of 3 $\mu$m was mixed into a solution of thermosetting resin of epoxy resin with the addition of an amine type binder, 4,4'-diaminodiphenylmethane (DDM) or m-phenylenediamine (MPD), which were kneaded under heating at 60° C. to 110° C. to prepare a binder comprising a mixture of the $SiO_2$ powder and the epoxy resin. According to this procedure, prepared were 6 kinds of binders containing therein the silica powder in an amount of 5, 20, 30, 48, 65 and 80% in terms of volume ratio, respectively.

After allowing the binders to stand until each of the epoxy resins contained therein assumed a half-cured state, these were subjected to extrusion processing and grinding processing to prepare powdery binders having particles sizes of 50 to 150 $\mu$m.

Each of these six kinds of the powdery binders and Fe-1.8%Si alloy powder having a mean particle size of 44 $\mu$m to 63 $\mu$m were mixed with each other in the ratio of 25:75 in parts by volume. Each of the powdery mixtures thus prepared was packed in a metallic mold and compression molded under pressure of 500 MPa, followed by heat treatment at 200° C. for 1 hour to produce six kinds of magnetic cores.

Figure 3:
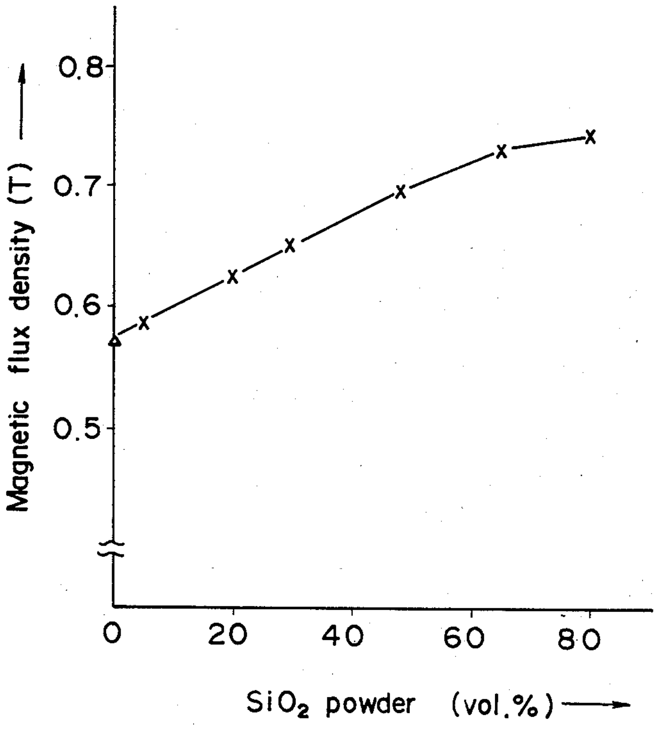
FIG. 3 shows a characteristic diagram representing the magnetic flux density of magnetic cores obtained in Example 13 of this invention.

Thereafter, values for the magnetic flux density of these six kinds of magnetic cores under the external magnetization field of 10000 AT/m were examined to obtain the results as shown in FIG. 3. In FIG. 3, abscissa is the ratios of the content of silica powder in the binder resin; the mark Δ denotes a result of a comparative example where no silica powder is contained at all in the binder resin.

As is apparent from FIG. 3, the higher the ratio of silica powder in the binder resin, the greater the improvement in the magnetic flux density. This is because the frictional resistance between the particles of the magnetic powder decreases owing to the rolling action of the silica powder and the presence of the resin dispersed among the particles of the magnetic powder and, as a result, the space factor of the Fe-1.8%Si alloy powder in the magnetic core has been improved. Moreover, it has been found and confirmed that the magnetic cores thus produced have effective electrical resistivity of 500 m$\Omega$·cm or higher which is a remarkably improved value as compared with the resistivity (30 m$\Omega$·cm or lower) of conventional magnetic cores, and also have excellent high frequency characteristics.

EXAMPLE 14

An inorganic compound of $CaCO_3$ powder having a mean particle size of 2 $\mu$m was mixed with a thermosetting resin of polyamide resin in a proportion of 25% in terms of volume % relative to the resin, and the mixture was subjected to cooling processing and extrusion processing to prepare a binder solid form, which was then milled or ground to obtain a powdery binder having a particle size of 74 μm or less.

The powdery binder was then mixed with Fe-1.5%Si alloy powder having a mean particle size of 63 μm. According to these procedures, prepared were four kinds of mixed materials (Sample Nos. 1 to 4) containing therein the magnetic alloy powder in an amount of 55, 65, 98 and 99% in terms of volume ratios, respectively. (Sample Nos. 1 and 2 are comparative examples, however.)

Thereafter, the mixed materials were compression molded under a pressure of 800 MPa, followed by heat treatment at a resin-softening temperature to produce the corresponding four kinds of magnetic cores.

Values for the magnetic flux density of these magnetic cores under an external magnetization field of 10000 AT/m were examined to obtain the results as shown in Table 3.

TABLE 3

| Sample No. | Binder resin (vol %) | Magnetic powder (vol %) | Magnetic flux density (T) (Hm = 10000 AT/m) | Effective resistivity (mΩ · cm) |
|---|---|---|---|---|
| 1 | 1.0 | 99 | 1.4 | 16 |
| 2 | 2.0 | 98 | 1.4 | 95 |
| 3 | 35 | 65 | 0.6 | 510 |
| 4 | 45 | 55 | 0.35 | 610 |

As is apparent from Table 3, the magnetic flux density of a core is lower than that in the case of a ferrite core when the content of the binder in the magnetic core exceeds 40%, while very high magnetic flux density can be obtained when the content is not more than 40%. The effective resistivity of the magnetic core is extremely lowered to a value corresponding to a conventional core when the above content is not more than 1.5%, while it is confirmed that a very high value of resistivity can be obtained when the content is not less than 1.5%.

Thus, it is possible to obtain magnetic cores suited for their intended use by controlling the content of the binder in the cores.

The inorganic compounds, the binder resin and the magnetic powder are not limited to those used in the above Examples, rather there may also be used mica, alumina or the like.

As apparent from the Examples, the magnetic core of this invention has a magnetic flux density by far greater than the magnetic core of a ferrite core or a magnetic dust core of the prior art, and also has a high effective resistivity. Further, when compared with a laminated magnetic core, the core of this invention has an effective magnetic permeability which changes less at frequency band region from 1 to 500 kHz, and its commercial value is great.

We claim:

1. A magnetic core, which comprises a compression molded product comprising:

a soft magnetic material selected from an iron powder, an iron alloy magnetic powder, and combinations thereof, said material having a mean particle size of 10 to 100 μm; and 1.5 to 40%, as a total amount in terms of volume ratio, of insulating binder resin and a non-ferrite insulating inorganic compound powder.

2. The magnetic core according to claim 1, wherein said iron powder or iron alloy magnetic powder, when its mean particle size is represented by D μm and its resistivity by $\rho\mu\Omega\cdot$cm, satisfies the relationship, when represented in terms of only the numerical values of $\rho$ and D, of $\rho/D^2 > 4\times10^{-3}$.

3. The magnetic core according to claim 1, wherein said inorganic compound powder has a mean particle size of 20 μm or less.

4. The magnetic core according to claim 1, wherein said iron powder or iron alloy magnetic powder is at least one selected from the group consisting of Fe powder, Fe-Si alloy powder, Fe-Al alloy powder, Fe-Si-Al alloy powder, Fe-Ni alloy powder and Fe-Co alloy powder.

5. The magnetic core according to claim 1, wherein said insulating binder resin is at least one selected from the group consisting of epoxy resins, polyamide resins, polyimide resins, polyester resins, polycarbonate resins, polyacetal resins, polysulfone resins and polyphenylene oxide resins.

6. The magnetic core according to claim 1, wherein said insulating inorganic compound powder is powder of at least one compounds selected from the group consisting of calcium carbonate, silica, magnesia, alumina, red iron oxide and glass.

7. The magnetic core according to claim 6, wherein said insulating inorganic compound powder has mean particle size of 1/5 or less of the mean particle size of the iron powder or iron alloy magnetic powder.

8. The magnetic core according to claim 1, wherein the total amount of said binder resin and said inorganic compound powder ranges from 1.5 to 40 vol %.

9. The magnetic core according to claim 8, wherein the ratio of said binder resin and said inorganic compound powder is 98 to 20 vol. %:2 to 80 vol. %.

10. A method of producing an magnetic core, which comprises a step of preparing a binder by mixing an insulating inorganic compound powder with a resin, a step of grinding said binder into a powder to prepare a powdery binder, and a step of mixing and compression molding said powdery binder with iron powder, iron alloy magnetic powder or a mixture thereof.

11. The method according to claim 10, wherein the compression molding is carried out under the pressure of from 100 to 1000 MPa.

* * * * *